(12) United States Patent
Santelli, Jr.

(10) Patent No.: US 12,413,056 B2
(45) Date of Patent: Sep. 9, 2025

(54) WIRE MANAGEMENT SYSTEM AND KITS

(71) Applicant: Albert Santelli, Jr., Middlesex, NJ (US)

(72) Inventor: Albert Santelli, Jr., Middlesex, NJ (US)

(73) Assignee: Albert Santelli, Jr., Middlesex, NJ (US)

( * ) Notice: Subject to any disclaimer, the term of this patent is extended or adjusted under 35 U.S.C. 154(b) by 0 days.

(21) Appl. No.: 18/328,360

(22) Filed: Jun. 2, 2023

(65) Prior Publication Data
US 2023/0396045 A1 Dec. 7, 2023

Related U.S. Application Data

(60) Provisional application No. 63/348,153, filed on Jun. 2, 2022.

(51) Int. Cl.
*H02G 3/04* (2006.01)

(52) U.S. Cl.
CPC ......... *H02G 3/0418* (2013.01); *H02G 3/0437* (2013.01)

(58) Field of Classification Search
CPC .. H02G 3/0437; H02G 3/0418; H02G 3/0608; F16L 45/00
See application file for complete search history.

(56) References Cited

U.S. PATENT DOCUMENTS

| | | | | | |
|---|---|---|---|---|---|
| 3,351,699 | A * | 11/1967 | Merckle | ............... | H02G 3/0608 174/101 |
| 3,968,322 | A * | 7/1976 | Taylor | ............... | H02G 3/045 174/101 |
| 4,349,220 | A * | 9/1982 | Carroll | ............... | H02G 3/0608 138/155 |
| 4,907,767 | A * | 3/1990 | Corsi | ............... | H02G 3/0437 174/101 |
| 5,435,606 | A * | 7/1995 | Navazo | ............... | H02G 3/0608 138/155 |
| 5,591,938 | A * | 1/1997 | Navazo | ............... | H02G 3/128 24/324 |
| 6,107,576 | A * | 8/2000 | Morton | ............... | H02G 3/0418 174/101 |
| 6,143,984 | A * | 11/2000 | Auteri | ............... | H02G 3/0608 174/101 |

(Continued)

FOREIGN PATENT DOCUMENTS

| | | | | |
|---|---|---|---|---|
| FR | 2831338 A1 * | 4/2003 | ............... | H02G 3/105 |
| GB | 2367954 A * | 4/2002 | ............... | H02G 3/0437 |

*Primary Examiner* — Eret C Mcnichols
(74) *Attorney, Agent, or Firm* — Calderone McKay LLC (57) ABSTRACT

A wire management system including a cover and a cover support housing to receive an electrical wire or cable. A kit of the wire management system includes one or more of the covers and cover support housings and or more connectors for joining or covering ends of adjacent covers. The cover, cover support housing and the one or more connectors can be formed of a material which is weather resistant and provides a protective barrier to weather elements and ultraviolet (UV) radiation. A universal mount coupled to the cover support housing is used to elevate the wire management system from a surface. Snap down latching of the cover, cover support housing and universal mount provides expeditious installation of the wire management system.

18 Claims, 10 Drawing Sheets

(56) References Cited

U.S. PATENT DOCUMENTS

| | | | | |
|---|---|---|---|---|
| 6,380,484 | B1* | 4/2002 | Theis | F16L 3/26 |
| | | | | 174/101 |
| 6,437,244 | B1* | 8/2002 | Vander Velde | H02G 3/0418 |
| | | | | 174/101 |
| 6,803,519 | B2* | 10/2004 | de la Borbolla | H02G 3/0418 |
| | | | | 174/95 |
| 6,903,265 | B1* | 6/2005 | VanderVelde | H02G 3/0418 |
| | | | | 174/68.3 |
| 7,049,508 | B2* | 5/2006 | Bushey | H02G 3/0425 |
| | | | | 174/68.3 |
| 7,250,574 | B2* | 7/2007 | Fox | H02G 9/04 |
| | | | | 174/101 |
| 7,615,710 | B2* | 11/2009 | Sayres | G02B 6/4459 |
| | | | | 174/72 A |
| 7,760,983 | B2* | 7/2010 | Jadaud | H02G 3/32 |
| | | | | 248/62 |
| 9,431,802 | B2* | 8/2016 | Anselmo | H02G 3/0462 |
| 9,938,729 | B2* | 4/2018 | Coon | E04F 17/08 |
| 10,180,219 | B1* | 1/2019 | Lahner | F21S 8/033 |
| 10,790,650 | B2* | 9/2020 | Faith | H02G 3/0418 |
| 11,479,921 | B2* | 10/2022 | Brooker | H02G 9/04 |
| 11,870,227 | B2* | 1/2024 | Bunea | H02S 40/36 |
| 2022/0339839 | A1* | 10/2022 | Yang | H02G 3/0418 |

* cited by examiner

WIRE MANAGEMENT SYSTEM AND KITS

BACKGROUND OF THE INVENTION

Field of the Invention

The present invention in general to an electric wire and cable management system and in particular to a system and method for mounting of a wire and cable management system for solar panel installations.

Description of Related Art

Solar panels are installed in outdoor environments. For example, solar panels can be mounted on roof tops. Solar wires and cables are used with installations of the solar panels. The outdoor environments subject the solar wires and cables to harsh weather conditions including damaging ultra violet (UV) radiation, direct rain, snow, hail dust and dirt.

U.S. Pat. No. 9,032,593 describes a structure to secure in place solar photovoltaic panels. The insertion step involves compressing a resilient member with a portion of a solar panel or other item or object to be secured, then snapping an opposite portion of the item or object into a detent. Strips can reside, at least partially, in a recess of a surface extending from a cam portions and in a recess of a surface extending from hook ends and in recess of a surface extending from a center connector of the structure. Strips may provide padding for the solar photovoltaic panels. Strips may additionally or alternatively provide an electrical connection with one or more receptors on solar photovoltaic panels.

It is desirable to provide an improved system and method for mounting of individual wires and cables easily in various arrangements with a wire management system in which the wire management system can be expeditiously attached to an outdoor surface.

SUMMARY OF THE INVENTION

The present invention relates to a wire management system including a cover and a cover support housing to receive an electrical wire or cable. A kit of the wire management system can include one or more of the covers and cover support housings and or more connectors for joining or covering ends of adjacent covers. The cover, cover support housing and the one or more connectors can be formed of a material which is weather resistant and provides a protective barrier to weather elements and ultraviolet (UV) radiation.

The cover can include a lip extending at either side wall. The lip can extend at a predetermined upward angle, such as for example 45 degrees. The cover support housing can include a flange in a U shape formed at either end of a side wall. The flange can include a flange lip. The flange lip can extend at a predetermined downward angle, such as for example 45 degrees. The lip of the cover can engage the flange lip of the cover support housing to attach the cover to the cover support housing. When the cover is attached to the cover support housing, a cavity is formed between the cover and the cover support housing to receive the wire or cable. The snap down latching lip of the cover with the flange lip at predetermined angles can aid to keep the cover secured to the cover support housing during high winds. The snap down latching provides expeditious installation of the wire management system.

A universal mount can be coupled to the cover support housing. The universal mount can include a pair of support structures. The support structures of the universal mount can be positioned in the form of a W shape. A mount flange can be formed at either end of side walls of the universal mount. The mount flange can be formed in a U-shape. The mount flange can include a flange protrusion, flange base and flange lip. A base protrusion at either end of the cover support housing can be received within the mount flange adjacent the flange lip for coupling the cover support housing to the universal mount. A release protrusion can be coupled or integral with the flange protrusion of the mount flange. The push of the release protrusion and lift release allow the cover support housing to be easily released from the universal mount for easy access and maintenance. The system can be sand ballast designed to keep surface mounted systems in place when needed.

The elevated modular mount keeps wires or cables a pre-determined distance from the roof surface. The universal mount allows for multiple installation options, including surface mount, unistrut type mount or directly to various racking systems by way of vertical and horizontal options. The snap on arrangement of the universal mount allows the system to be mounted in any direction. The system is symmetrical, and components can be mounted in both directions to provide time savings on installs. Alternatively, the cover support housing can be surface mounted without the use of the universal mount.

The connectors can include curved connectors and T shaped connectors for connecting adjacent covers which are coupled to cover support housings. An end cap can be attached to the covers and/or connectors to keep animals from nesting inside the system. A connector can be sand ballast designed to keep surface mounted systems in place when needed. The system is quick and easy to use, it requires no special tools, and the system will stay as installed and can be easily accessed if maintenance is required. The system is UV stable for all solar installations.

The invention will be more fully described by reference to the following drawings.

Embodiments of the present disclosure and their advantages are best understood by referring to the detailed description that follows. It should be appreciated that the figures may not be necessarily drawn to scale.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
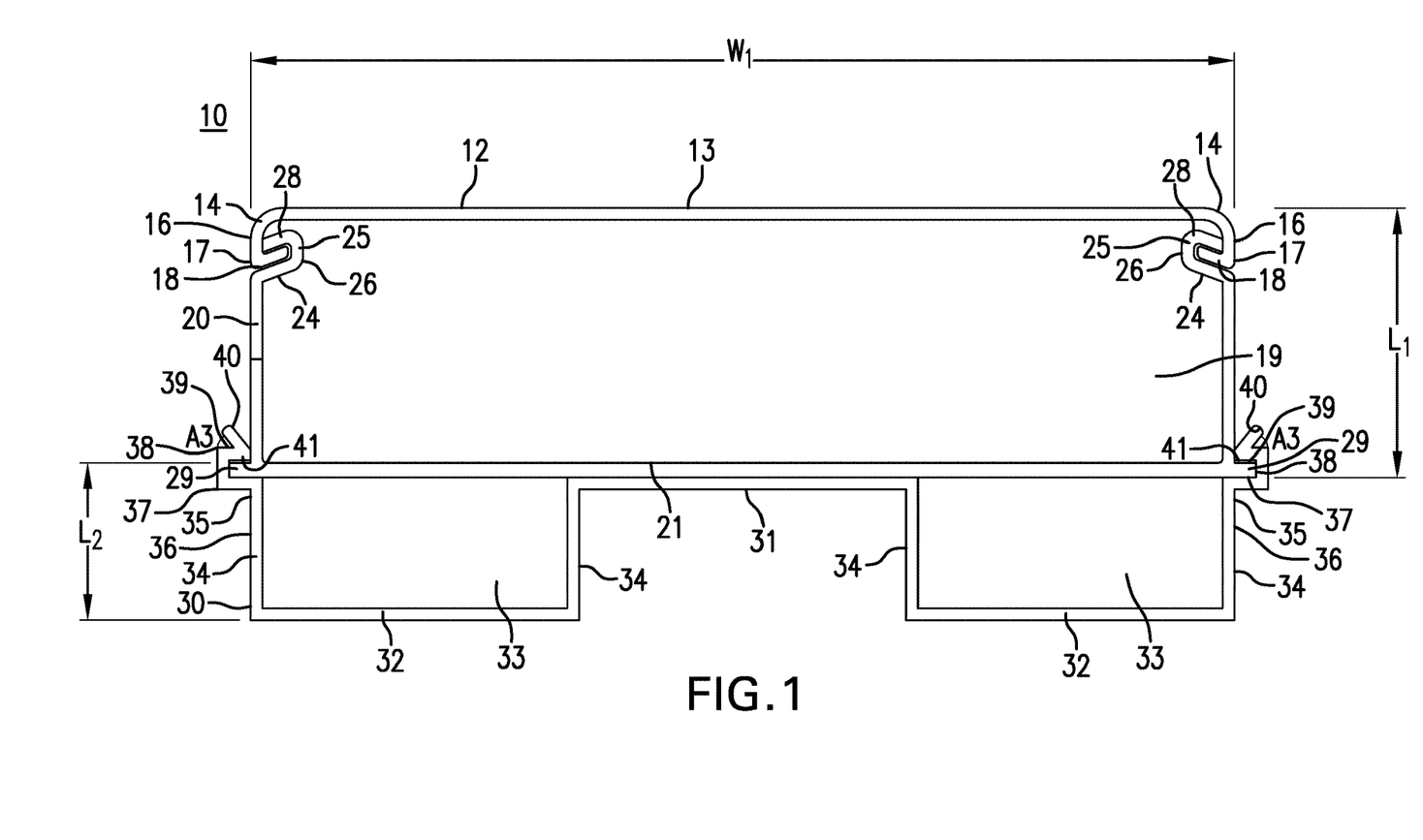
FIG. 1 is an end view of a wire management system in accordance with the teachings of the present invention.
Figure 2:
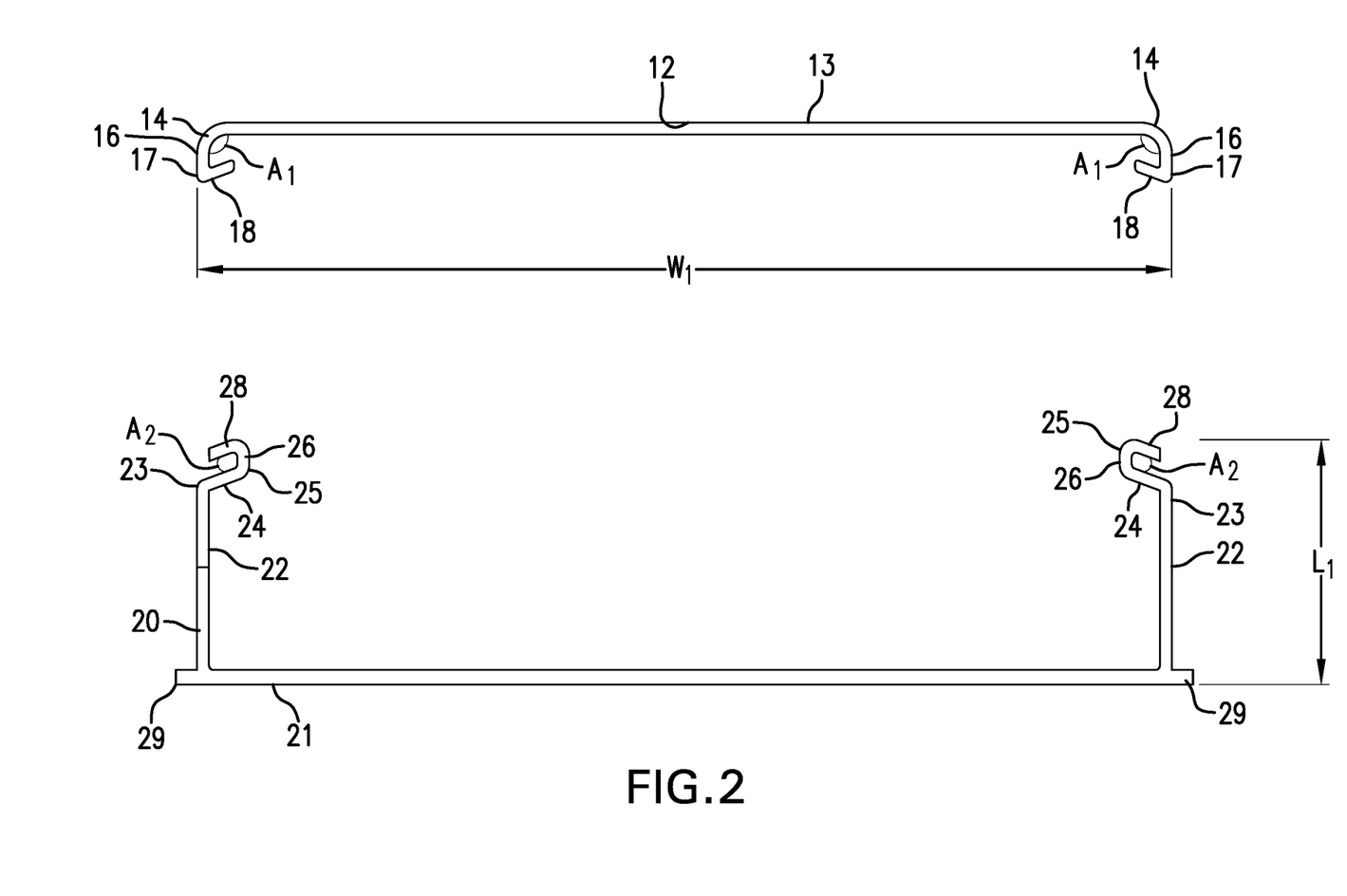
FIG. 2 is a schematic diagram of a cover and cover support housing of the wire management system.

FIG. 1 is an end view of wire management system 10. Referring to FIG. 2, cover 12 incudes top wall 13. Side walls 16 are coupled or integral with either end 14 of top wall 13. In one embodiment, side walls 16 can extend perpendicular to top wall 13.

Lip 18 extends at end 17 of side wall 16 of cover 12. Lip 18 can extend at an upward angle A1 from side wall 16. Angle A1 can be in a range of about 30 to about 70 degrees, about 35 to about 65 degrees, about 40 to about 50 degrees. Angle A1 can be about 45 degrees.

Cover support housing 20 includes bottom wall 21. Side walls 22 are coupled or integral with either end 24 of bottom wall 21. In one embodiment, side walls 22 can extend perpendicular to bottom wall 21. Housing flange 26 can be formed at end 23 of side walls 22. Housing flange 26 can be formed in a U-shape. Housing flange 26 can include flange protrusion 24, flange base 25 and flange lip 28. Flange lip 28 can extend at a downward angle A2 from flange base 25. Angle A2 can be in a range of about 30 to about 70 degrees, about 35 to about 65 degrees, about 40 to about 50 degrees. Angle A2 can be about 45 degrees. Angle A2 can be the same as Angle A1. Base protrusions 29 extend at either end 27 of bottom wall 21.

Lip 18 of cover 12 can engage flange lip 28 of cover support housing 20 to attach cover 12 to cover support housing 20 as shown in FIG. 1. When cover 12 is attached to cover support housing 20, cavity 19 is formed between cover 12 and cover support housing 20. In the closed position, top wall 13 of cover 12 can be parallel to bottom wall 21 of cover support housing 20. In an open position, lip 18 of cover 12 is disengaged from flange lip 28 as shown in FIG. 2. Lip 18 and housing flange 26, including flange lip 28, can be formed of a rigid or flexible plastic material to allow lip 18 of cover 12 to be disengaged from flange lip 28 and to allow lip 18 of cover 12 to be snapped into engagement with flange lip 28. Cover 12 can be formed of a rigid UV stabilized polyvinyl chloride (PVC). In one embodiment, lip 18 and flange lip 28 can be formed of a flexible material, such as flexible plastic or thermoplastic. For example, the flexible plastic can be flexible polyvinyl chloride (PVC).

Cover 12 and cover support 20 can be formed of a material which is weather resistant and provides a protective barrier to weather elements and ultraviolet radiation. For example, cover 12 and cover support 20 can be formed of a rigid plastic. Suitable materials for cover 12 and cover support 20 include rigid polyvinyl chloride (PVC). Lip 18 can be co-extruded with side walls 16 and top wall 13 of cover 12. Flange lip 28, can be co-extruded with side walls 22 and bottom wall 21 of cover support 20.

Referring to FIG. 1, universal mount 30 can be coupled to cover support housing 20. Universal mount 30 includes a pair of support structures 36. Support structures 36 are formed of base wall 32 coupled or integral with side walls 34. Support structures 36 are coupled or integral with upper support wall 31. Universal mount 30 can have a wavy shape in the form of a W shape.

Mount flange 37 can be formed at end 35 of side walls 34. Mount flange 37 can be formed in a U-shape. Mount flange 37 can include flange protrusion 39, flange base 38 and flange lip 41. Base protrusion 29 at either end 27 of cover support housing 20 can be received within mount flange 37 adjacent flange lip 41 for coupling cover support housing to universal mount 30. Cavity 33 is formed between cover support housing 20 and universal mount 30. Release protrusion 40 can be coupled or integral with flange protrusion 39 of mount flange 37. Release protrusion 40 can be angled from flange protrusion 39. For example, release protrusion 40 can be angled at an angle A3 from flange protrusion 39. Angle A3 can be in a range of about 30 to about 70 degrees, about 35 to about 65 degrees, about 40 to about 50 degrees. Angle A3 can be about 45 degrees. Release protrusion 40 can be pressed to disengage universal mount 30 from cover support housing 20.

Cover 12 can have a width W1 in the range of about 0.5 to about 6 inches, about 1 to about 4 inches and about 2.0 to about 3.0 inches. Cover support housing 20 can have a length L1 which is typically less than width W1 of cover 12. For example, cover support housing 20 can have a length L1 in the range of 0.5 to 2.5 inches, about 0.75 to about 2.0 inches about 1.0 to about 1.25 inches. L1 has a length to provide a sufficient height of cavity 19 to receive wires or cables of an associated solar panel.

Universal mount 30 can have a length L2 which is typically less than length L1 of cover support housing 20. For example, universal mount 30 can have a length L2 in the range of 0.5 to 2.0 inches, about 0.75 to about 1.25 inches about 0.875 (⅞ inches) to about 1.0 inches. L2 has a length to provide a sufficient height of support structures 36 from an attached surface, such as for example a roof or wall.

Figure 3:
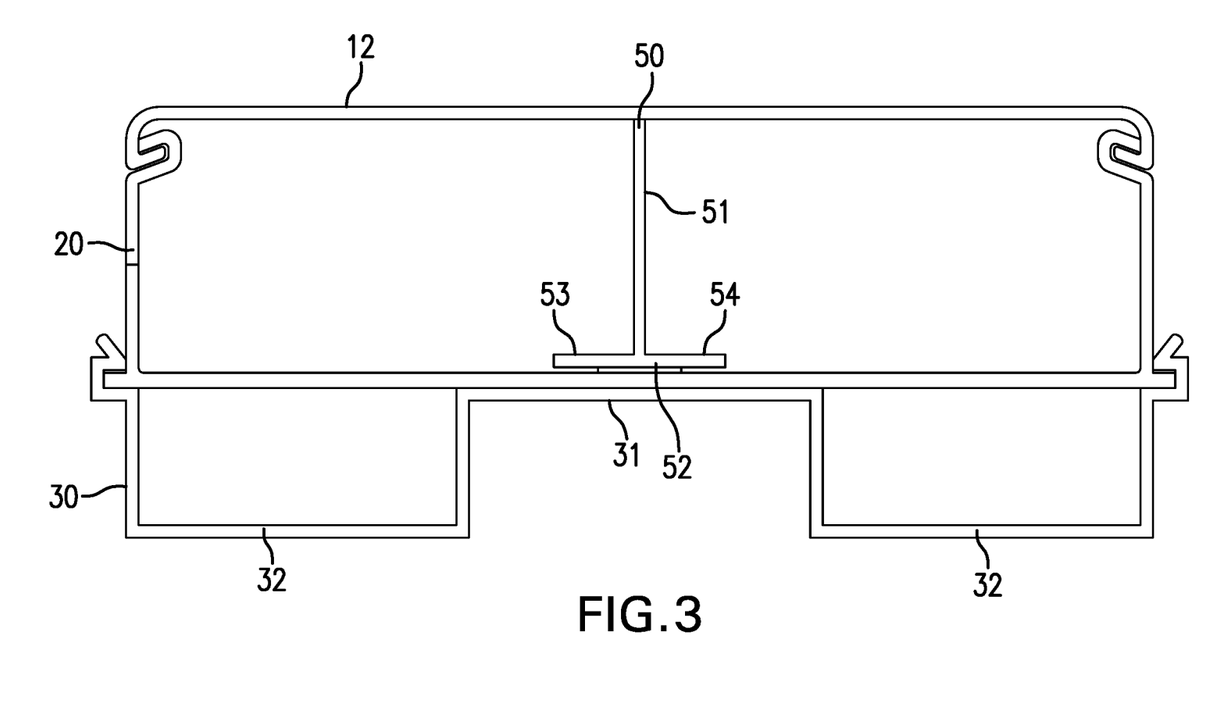
FIG. 3 is an end view of the wire management system including a center support
Figure 4:
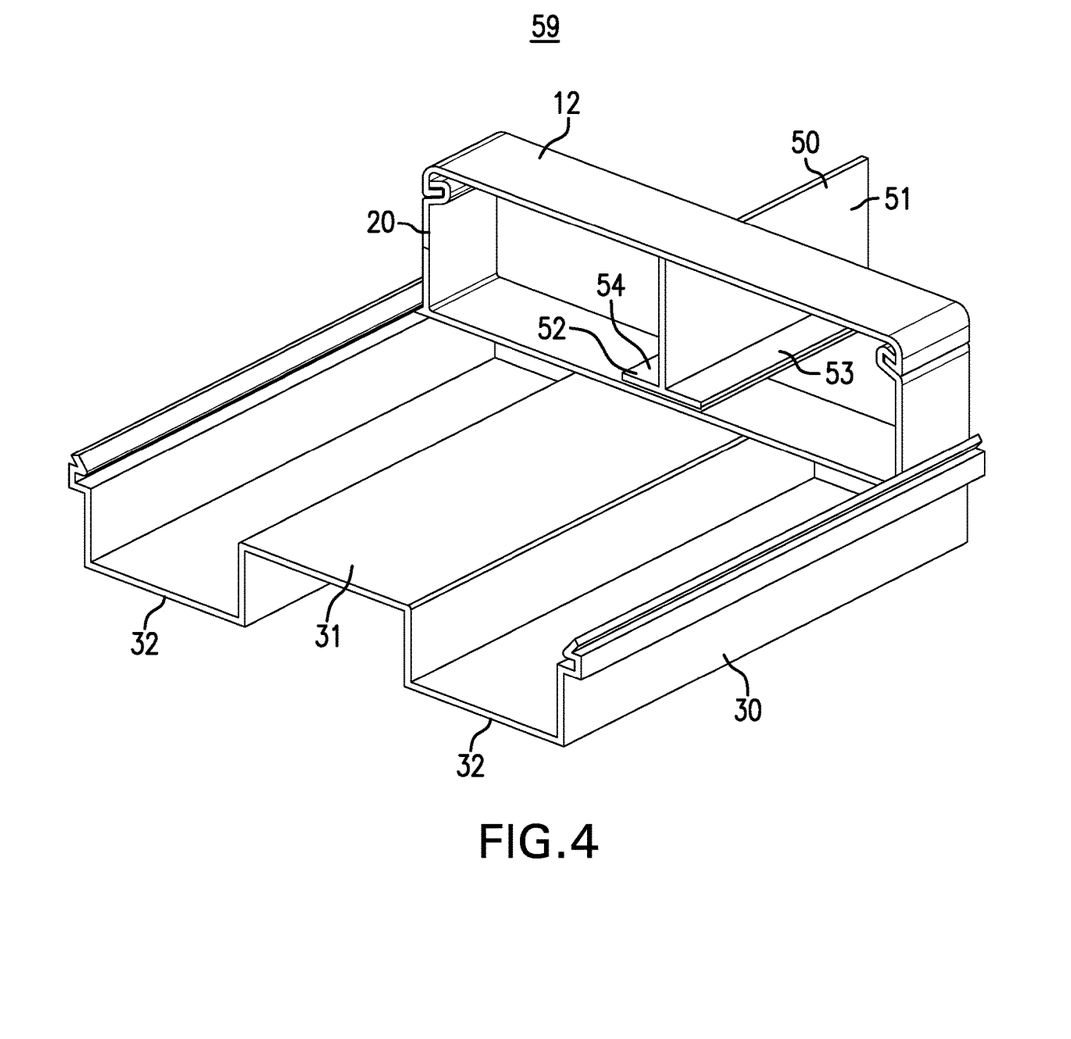
FIG. 4 is a cross section view of the wire management system.

FIG. 3 is a schematic diagram of support 50. Support 50 can be positioned between cover 12 and cover support housing 20 as shown in FIG. 4. Referring to FIG. 3, Support 50 can be formed of center wall 51 extending from base 52. Base 52 can include side wall 53 and side wall 54 on either side of center wall 51. Support 50 can be positioned within cavity 19 to separate cavity 19 into a plurality of sections.

Figure 5:
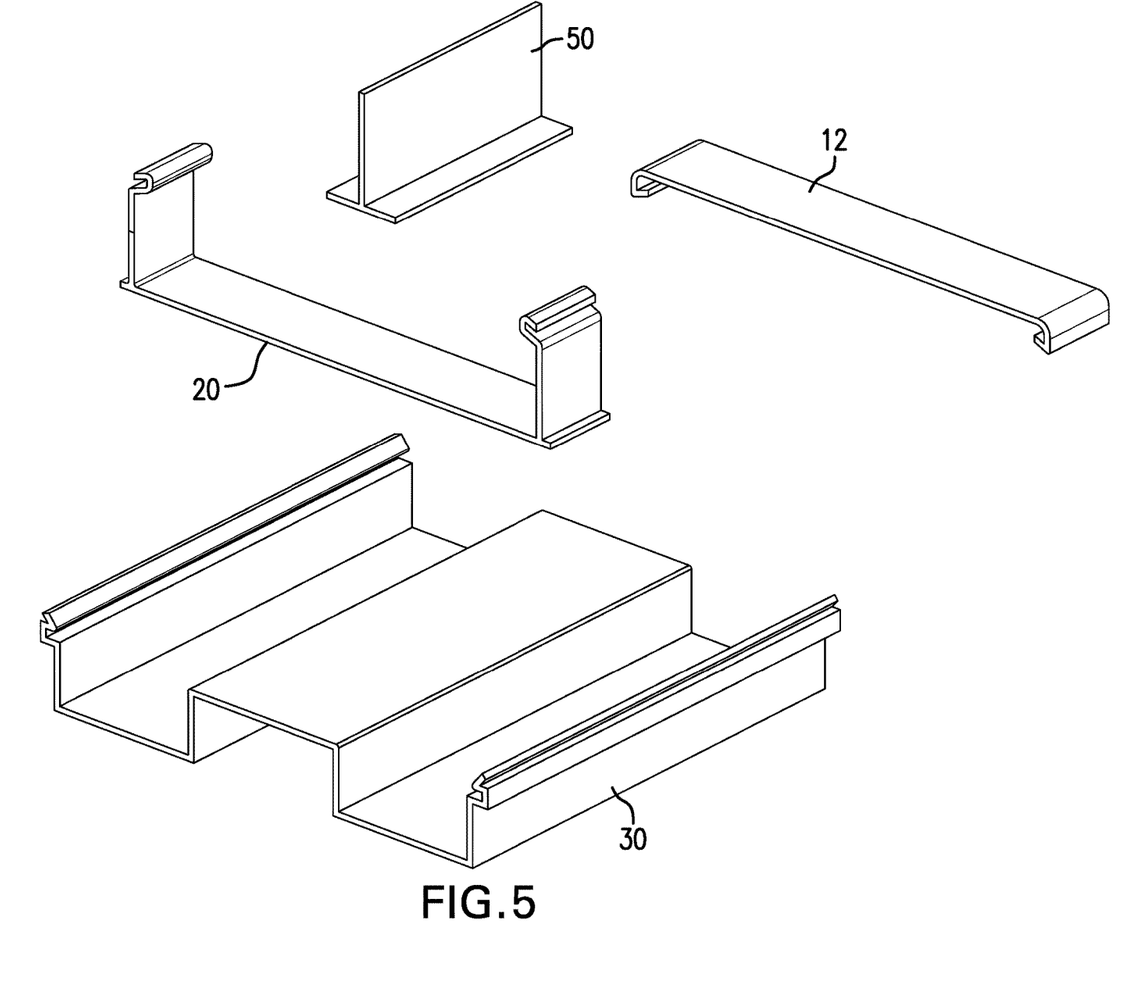
FIG. 5 is a schematic diagram of individual structures used in the wire management system.

FIGS. 4 and 5 illustrate kit 59 including cover 12, cover support housing 20, universal mount 30 and support 50. During use of kit 59, cover 12 can be snap fit onto cover support housing 20. Cover support housing 20 can be snap fit onto universal mount Support 50 can be received within cover support housing 20 before or after coupling of cover 12 to cover support housing 20.

Figure 6:
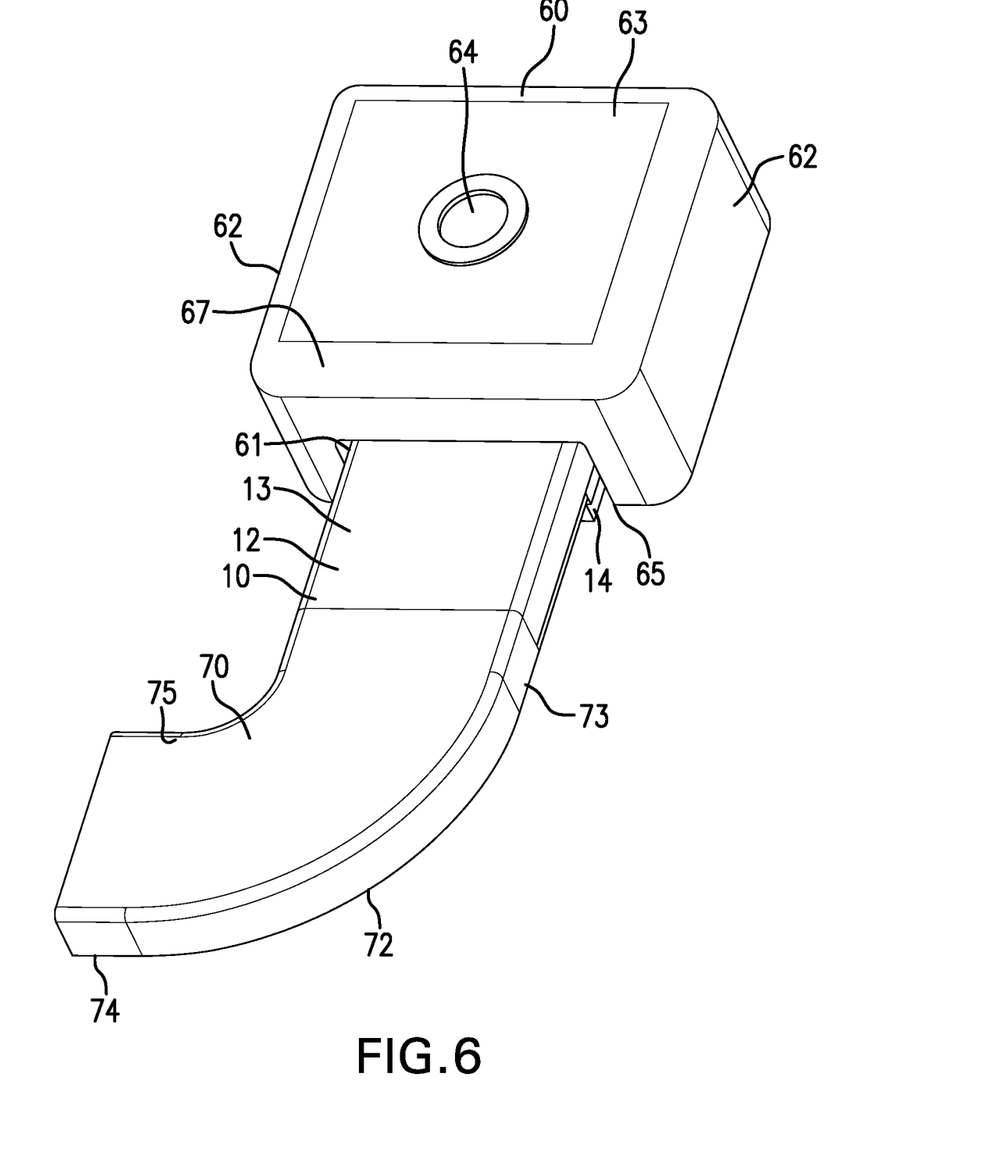
FIG. 6 is a schematic diagram of a fitting used with the wire management system.
Figure 7:
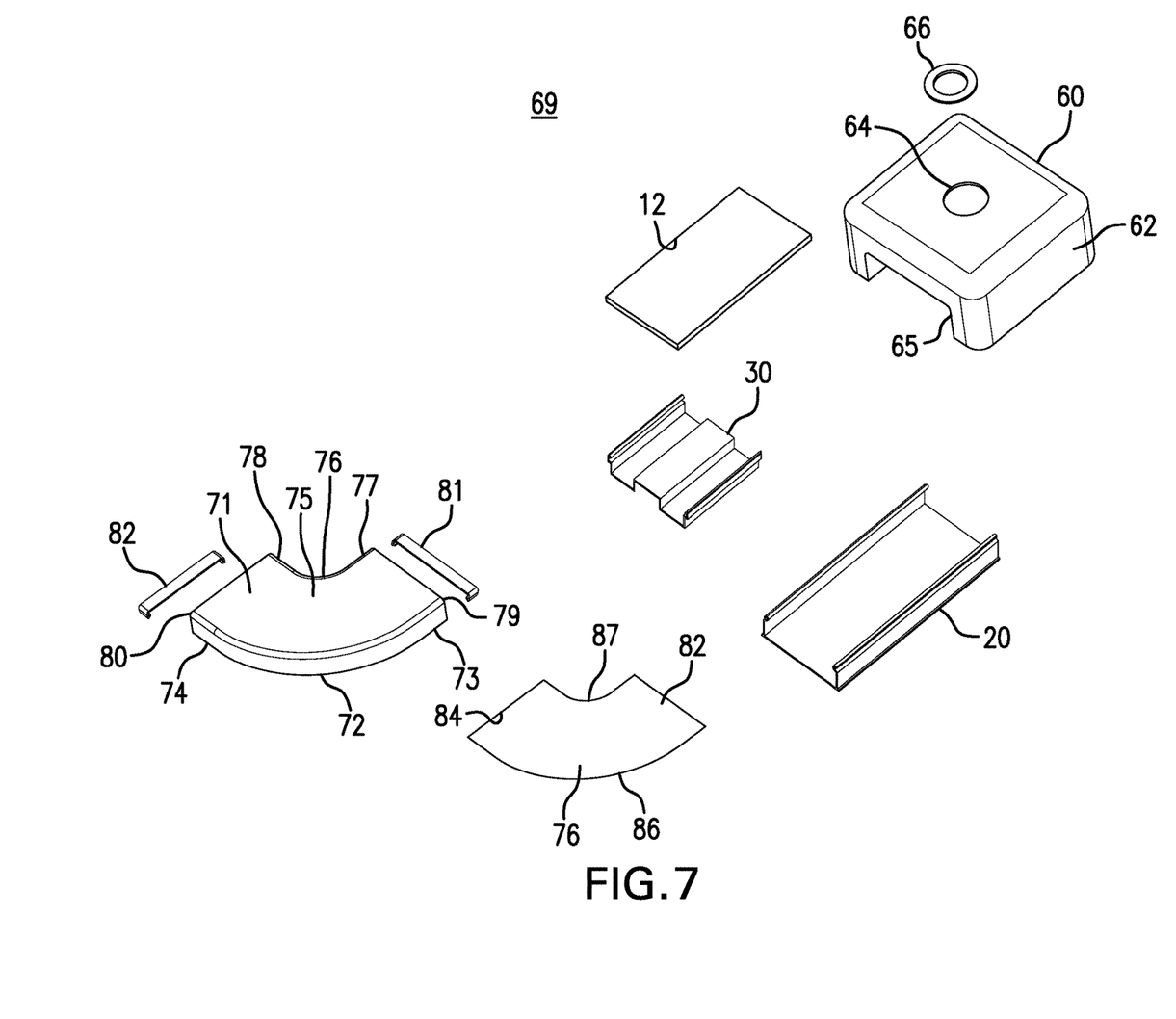
FIG. 7 is a schematic diagram of individual structures used in the fitting shown in FIG. 6.

Referring to FIG. 6, wire management system 10 can be used with connector 60 and curved connector 70. Connector 60 includes housing formed of cover wall 63 coupled or integral with side walls 62 and ballast support wall 61. Cavity 67 can be formed between cover wall 63, side walls 62 and ballast support wall 61. Aperture 64 can be formed in cover wall 63 to extend into cavity 67. Aperture 64 can be covered by cap 66 as shown in FIG. 7. Cavity 67 can receive a ballast material for providing weight and stability to connector 60. For example, the ballast can be sand or gravel. Connector 60 includes cavity Wire management system 10 can be received in cavity 65.

FIG. 7 illustrates kit 69 including curved connector 70. Curved connector 70 can connect or cover adjacent cover 12 and cover support housing 20. Curved connector 70 can include bottom wall 71 coupled or integral with inner side wall 75 and outer side wall 72. Bottom wall 71, inner side wall 75 and outer side wall 72 can have a curved shape. The length of inner side wall 75 can be smaller than the length of outer side wall 72. End 73 of outer side wall 72 and end 77 of inner side wall 75 can be coupled to cover support housing 20 using locking connector 81 as shown in FIG. 7. End 74 of outer side wall 72 and end 78 of inner side wall 75 can be coupled to cover support housing 20 using locking connector 82. Curved cover 76 can be coupled to curved connector 70. Curved cover 76 includes inner side wall 87 and outer side wall 86. Curved cover 76 provides an enclosed bottom and a means for aligning curved connector 70 to an assembly cover 12 and cover support housing 20. Inner side wall 87 and outer side wall 86 can have a curved shape. The length of inner side wall 87 can be smaller than the length of outer side wall 86 and respectively match the length of inner side wall 75 and the length of outer side wall 72. Curved connector 70 can provide a minimum bend radius of about 2 inches. During use wires and cables from an extend through cavity 19 and extend through opening 79 and opening 80 of curved connector 70. Curved connector 70 can be used with cover support housing 20 which is attached in different directions such as a vertical and a horizontal direction.

Figure 8:
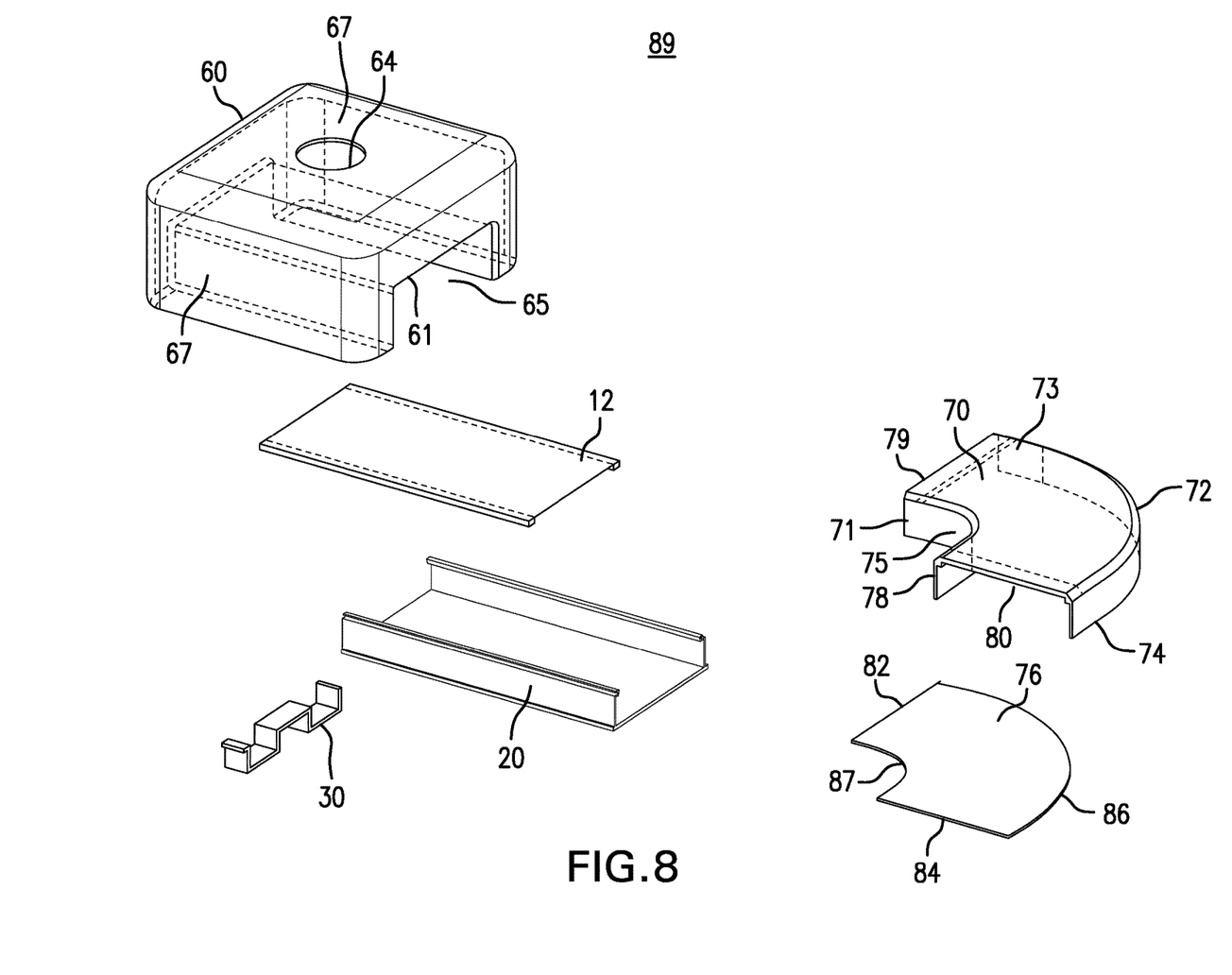
FIG. 8 is a schematic diagram of individual structures used in the fitting shown in FIG. 6.

FIG. 8 illustrates kit 89 including cover 12, cover support housing 20, universal mount 30, connector 60 and curved connector 70. During use of kit 89, cover 12 can be snap fit onto cover support housing 20. Cover support housing 20 can be snap fit onto universal mount 30. Curved cover 76 can snap fit into curved connector 70. One end of cover support housing 20. is received in cavity 65 of connector 60 and the other end of cover support housing 20 is received in opening 79 of curved connector 70.

Figure 9:
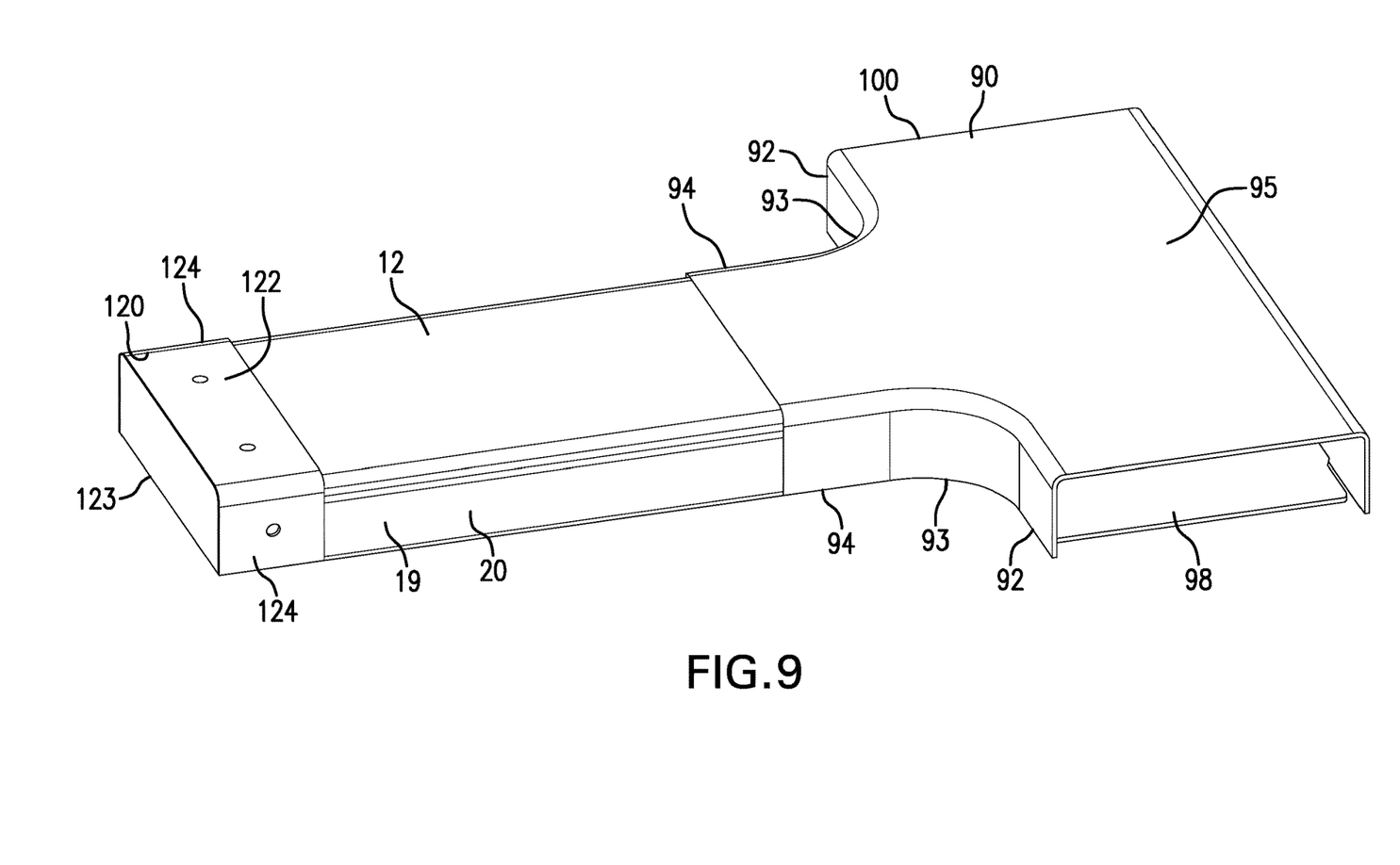
FIG. 9 is a schematic diagram of a fitting used with the wire management system
Figure 10:
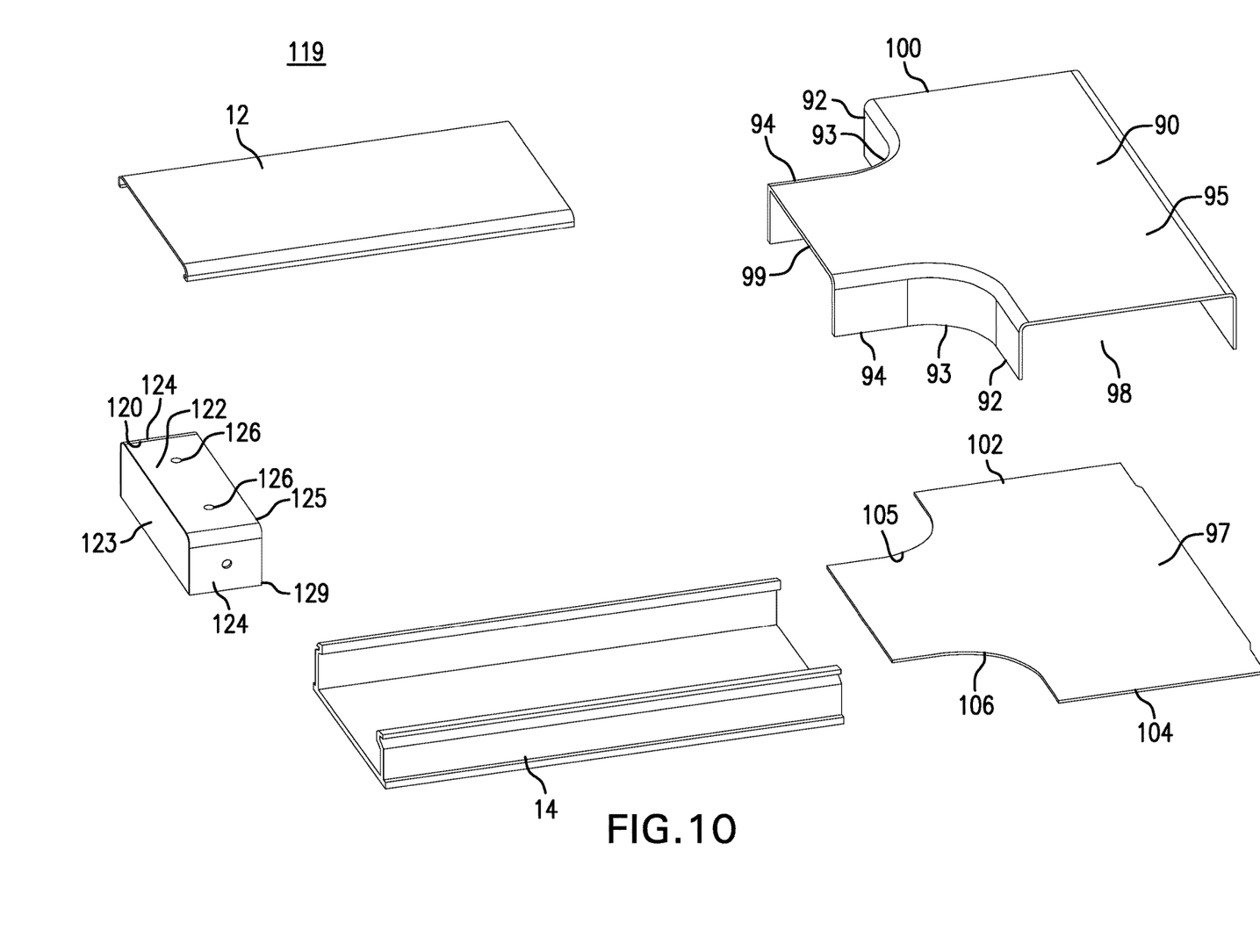
FIG. 10 is a schematic diagram of individual structures used in the fitting shown in FIG. 9.

Referring to FIG. 9, T shaped connector 90 can connect or cover adjacent covers 12. T shaped connector 90 can include front wall 95 coupled or integral with side walls 93. Front wall 95 can have a T shape. In one embodiment, edges of the T shape are curved. Side wall 93 can be formed of first end 92 and second end 94. First end 92 can be perpendicular to second end 94. First end 92 and second end 94 can connected with side wall 93 having a curved shape. T shaped cover 97 can be coupled to T shaped connector as shown in FIG. 10. T shaped cover 97 includes side walls 105. Side wall 105 can have a curved T shape. and respectively match the length of side walls. Referring to FIG. 9, during use wires and cables from an extend through cavity 19 and extend through opening and opening 98 of T shaped connector 90. T shaped connector 90 can be used with cover support housing 20 which is attached in different directions such as a vertical and a horizontal direction.

End cap 120 incudes front wall 122 coupled or integral with side walls 124 and end wall 123. Base wall 127 is coupled or integral with side walls 124 and end wall 123. End cap 120 includes opening 125 at end 129 as shown in FIG. 10. Attachment holes 126 can be formed in end cap 120 for attaching end cap 120 to cover 12.

FIG. 10 illustrates kit 119 including cover 12, cover support housing 20, T shaped connector 90 and end cap 120. During use of kit 119, cover 12 can be snap fit onto cover support housing 20. T shaped cover 97 can snap fit into T shaped connector 90. One end of cover support housing 20. is received in cavity 99 of T shaped connector 90 and the other end of cover support housing 20 is received in opening 125 of end cap 120.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A wire management system comprising:
   a cover, the cover including a top wall, side walls of the cover are coupled or integral with either end of the top wall, a lip extending at an end of each of the side walls of the cover;
   a cover support housing, the cover support housing includes a bottom wall, side walls of the cover support are coupled or integral with either end of the bottom wall, a housing flange formed at an end of each of the side walls of the cover support, the housing flange including a flange lip, the lip of the cover extends at an upward angle in a range of about 30 to about 70 degrees and the flange lip extends at a downward angle in a range of about 30 to about 70 degrees, and a connector including a housing formed of a cover wall coupled or integral with side walls and a ballast support wall, a cavity being formed between the cover wall, side walls and ballast support wall, the cavity being configured to receive a ballast material and
   wherein the lip of the cover is configured to engage the flange lip of the cover support housing with snap down latching to attach the cover to the cover support housing and when the cover is attached to the cover support housing a cavity is formed between the cover and the cover support housing.

2. The wire management system of claim 1 wherein the upward angle of the lip of the cover is 45 degrees and the downward angle of the flange lip is 45 degrees.

3. The wire management system of claim 1 wherein the housing flange has a U shape.

4. The wire management system of claim 1 wherein the side walls of the cover support housing extend perpendicular to the bottom wall.

5. The wire management system of claim of claim 1 wherein the lip of the cover and the flange lip are formed of a rigid or flexible plastic material to allow the lip of the cover to be disengaged from the flange lip and to allow the lip of the cover to be snapped into engagement with the flange lip.

6. The wire management system of claim 1 wherein the lip of the cover and the flange lip are formed of flexible polyvinyl chloride (PVC).

7. The wire management system of claim 1 wherein the cover and the cover support housing are formed of a weather resistant material.

8. The wire management system of claim 1 wherein the cover is formed of a rigid UV stabilized polyvinyl chloride (PVC).

9. The wire management system of claim 1 wherein the lip of the cover and the flange lip are formed of a flexible plastic or thermoplastic, the cover and the cover support housing are formed of a rigid plastic, the lip of the cover is co-extruded with the side walls and the top wall of the cover and the flange lip is co-extruded with the side walls and the bottom wall of the cover support.

10. The wire management system of claim 1 further comprising a universal mount configured to be coupled to the cover support housing, the universal mount including a pair of support structures coupled or integral with an upper support wall.

11. The wire management system of claim 1 further comprising a support, the support including a center wall extending from a base, the support being configured to be positioned between the cover and the cover support housing.

12. A wire management system comprising:
a cover, the cover including a top wall, side walls of the cover are coupled or integral with either end of the top wall, a lip extending at an end of each of the side walls of the cover; and
a cover support housing, the cover support housing includes a bottom wall, side walls of the cover support are coupled or integral with either end of the bottom wall, a housing flange formed at an end of each of the side walls of the cover support, the housing flange including a flange lip, a universal mount configured to be coupled to the cover support housing, the universal mount including a pair of support structures coupled or integral with an upper support wall and further comprising a mount flange at an end of side walls of each of the pair of support structures, the mount flange having a U-shape and a mount flange lip, a base protrusion at either end of the cover support housing configured to be received within the mount flange adjacent the mount flange lip for coupling the cover support housing to the universal mount and wherein a cavity is formed between the cover support housing and the universal mount and wherein the lip of the cover is configured to engage the flange lip of the cover support housing to attach the cover to the cover support housing and when the cover is attached to the cover support housing a cavity is formed between the cover and the cover support housing.

13. The wire management system of claim 12 further comprising a release protrusion coupled or integral with the mount flange, the release protrusion configured to be pressed to disengage the universal mount from the cover support housing.

14. A wire management system kit comprising:
a cover, the cover including a top wall, side walls of the cover are coupled or integral with either end of the top wall, a lip extending at an end of each of the side walls of the cover;
a cover support housing, the cover support housing includes a bottom wall, side walls of the cover support are coupled or integral with either end of the bottom wall, a housing flange formed at an end of each of the side walls of the cover support, the housing flange including a flange lip, the lip of the cover extends at an upward angle in a range of about 30 to about 70 degrees and the flange lip extends at a downward angle in a range of about 30 to about 70 degrees, a universal mount configured to be coupled to the cover support housing, the universal mount including a pair of support structures coupled or integral with an upper support wall;
a support, the support including a center wall extending from a base, the support being configured to be positioned between the cover and the cover support housing, and a connector including a housing formed of a cover wall coupled or integral with side walls and a ballast support wall, a cavity being formed between the cover wall, side walls and ballast support wall, the cavity being configured to receive a ballast material and
wherein the lip of the cover is configured to engage the flange lip of the cover support housing with snap down latching to attach the cover to the cover support housing and when the cover is attached to the cover support housing a cavity is formed between the cover and the cover support housing.

15. The wire management system kit of claim 14 further comprising a curved connector, the curved connector including a bottom wall coupled or integral with an inner side wall and an outer side wall, the bottom wall, the inner side wall and the outer side wall having a curved shape.

16. The wire management system kit of claim 14 further comprising a T shaped connector, the T shaped connector including a front wall coupled or integral with side walls, the front wall having a T shape.

17. The wire management system kit of claim 14 further comprising an end cap, the end cap configured to be attached to the cover and/or a curved connector and/or a T shaped connector.

18. The wire management system kit of claim 14 wherein the upward angle of the lip of the cover is 45 degrees and the downward angle of the flange lip is 45 degrees.

* * * * *